United States Patent [19]
Burton et al.

[11] 3,871,907

[45] Mar. 18, 1975

[54] DECORATIVE WALLCOVERING

[75] Inventors: Arthur Burton, Denton; Arthur John Naylor, Hazlemere; John Anthony Handforth, Bollington, all of England

[73] Assignee: Imperial Chemical Industries Limited, London, England

[22] Filed: May 29, 1973

[21] Appl. No.: 364,633

[30] Foreign Application Priority Data
June 5, 1972    Great Britain ................... 26136/72

[52] U.S. Cl. ................ 117/76 P, 117/60, 117/68.5, 117/72, 72/111 R, 117/155 UA
[51] Int. Cl. ......................... B32b 29/00, B44d 1/14
[58] Field of Search .... 117/76 P, 76 T, 60, 155 UA, 117/45, 68.5

[56]    References Cited
UNITED STATES PATENTS
| | | | |
|---|---|---|---|
| 2,683,094 | 7/1956 | Jones et al. ..................... | 117/76 P X |
| 3,066,043 | 11/1962 | Hechtman et al. ............. | 117/76 P X |
| 3,416,948 | 12/1968 | Maurer ............................. | 117/76 T |
| 3,711,317 | 1/1973 | Bleier ............................... | 117/60 X |

FOREIGN PATENTS OR APPLICATIONS
1,184,563    3/1970    Great Britain ..................... 117/76 P OTHER PUBLICATIONS
Felicione et al., Painting Vinyl-Coated Sheeting, National Paint, Varnish and Lacquer Assn., Inc., pp. 7–12, April 1960.

*Primary Examiner*—Ralph Husack
*Attorney, Agent, or Firm*—Cushman, Darby & Cushman

[57]    ABSTRACT

The surface of a sheet, layer or molded article of a plasticized polymeric material is coated with a first lacquer coating serving to reduce plasticizer migration from the plasticized material and a second lacquer coating containing a particulate inorganic material, serving to render the surface suitable for painting with a decorative paint. Vinyl wallcovering, such as vinyl coated paper, may be so treated.

6 Claims, No Drawings

DECORATIVE WALLCOVERING

This invention relates to a lacquer for applying as a coating on to the surface of a sheet, layer or moulded article of a polymeric material, and particularly a plasticised polymeric material, in order to render the surface suitable for painting with the usual commercially available paints.

Generally speaking, conventional decorative paints cannot be applied satisfactorily on to the surface of a sheet, layer or moulded article of a plasticised polymeric material, for example plasticised polyvinyl chloride. Apart from the paint not adhering to, and not forming a film on, the surface, the plasticiser within the surface migrates into the paint and causes rapid deterioration of the paint film.

We have now found that if a continuous coating of a lacquer based on a suitable film-forming polymer and containing a substantial proportion of a particulate inorganic material is first applied on the plastic surface then the coated surface, when dry, can be painted with the usual commercially available paints.

According to our invention the lacquer comprises a dispersion of a suitable film-forming polymeric material in one or more suitable volatile liquids, the lacquer containing from 90 to 480 parts by weight, per 100 parts by weight of the film-forming polymeric material, of a particulate inorganic material to which the paint to be used can adhere.

A preferred lacquer according to the invention contains from 90 to 390 parts by weight, per 100 parts by weight of the film-forming polymeric material of the particulate inorganic material.

Preferably the particle size of the particulate inorganic material is less than 300 microns and more preferably is in the range 2.5 millimicrons to 40 microns.

Though the particulate material is said to be inorganic, it should be understood that, though substantially inorganic, the particles may have a surface coating of an organic material. In particular a number of commercially available fillers which are suitable for use in the lacquer are provided with a surface coating of an organic material to improve the light stability and/or dispersibility of the particulate filler.

The particulate material serves to provide the lacquer coating with a relatively rough surface to which the subsequently applied paint layer can adhere. Furthermore, if the particulate material is hydrophilic then water based paints, for example emulsion paint, can adhere readily to those particles which protrude from the surface of the lacquer coating.

EXamples of suitable materials, in particulate form, are chalk, slate, quartz, talc, barytes, aluminium salts, synthetically prepared calcium carbonate, for example precipitated calcium carbonate, calcium sulphate. Furthermore the particulate additive may consist, wholly or partly, of an inorganic pigment such as titanium dioxide, carbon black, chrome yellow, zinc oxide, antimony oxide or iron oxide.

A wide range of film-forming polymeric materials can be used in the lacquer. Where plasticiser migration from the polymeric surface does not occur or where plasticiser migration is insufficient to affect the subsequently applied paint layer, for example if the surface is of an unplasticised or low plasticised polyvinyl chloride, any of the usual film-forming polymers may be used, for example polymers and copolymers of vinyl chloride, vinyl acetate, various methacrylates and acrylates, vinylidene chloride, styrene, butadiene, acrylonitrile, vinyl acetals and butyrals, vinyl alcohol, nitrocellulose, various amides and cellulose esters.

Where plasticiser migration can occur, for example from surfaces of plasticised polyvinyl chloride, the choice of the film-forming polymeric material is restricted to those polymers which have a limited compatibility with the plasticiser in the polymeric surface in order to reduce substantially the chance of plasticiser migration. Furthermore useful polymers are those having a glass transition temperature of greater than 70°C. It should be understood that where cross linking reactions can occur in the formation of the polymer these are complete before the glass transition temperature is determined, Examples of suitable polymers are polyvinyl chloride, low acetate copolymers of polyvinyl chloride and polyvinyl acetate, polystyrene polymers and copolymers of various vinyl acetals, polymers and copolymers of methyl methacrylate, polymers and copolymers of acrylonitrile, polymers and copolymers of polyvinyl alcohol. In preference we use those polymers having a glass transition temperature in excess of 95°C, the preferred polymers being polymers and copolymers of methyl methacrylate & polymers and copolymers of acrylonitrile. Suitable volatile liquids for use in the lacquer can be selected from ketones, e.g., methyl ethyl ketone, methyl iso-butyl ketone, cyclohexamine; from esters e.g., butyl acetate, ethyl lactate, isopropylacetate; aromatic hydrocarbons, e.g., benzene, toluene, xylene; from alcohol, e.g., ethanol, iso-propanol; and water and dimethyl formamide. e.g., In a preferred lacquer according to the invention is included a small proportion, up to 10 parts by weight, and more preferably from 0.05 to 5.0 parts by weight, based on 100 parts by weight of the film-forming material, of an additive which improves the dispersion of the particulate inorganic material within the lacquer; preferably, however, we select a dispersing additive which, at least in part, acts as an auxilliary or complementary drier for those paints which harden by oxidation, for example oil based paints. Suitable additives include cobalt, lead, calcium, zinc, copper, manganese, iron, cadmium, tin, barium, vanadium, aluminium salts, particularly of naphthenic acid, benzoic acid, lauric acid, stearic acid, octoic acid, tall oil and mixtures thereof. Preferred dispersing additives/paint driers are zinc soaps, particularly zinc naphthenate and octoate.

Though the lacquer of the invention may be applied directly on to the plastic surface to render the surface suitable for painting we prefer, when the polymeric material is plasticised, to first apply on to the surface a lacquer which merely serves to prevent migration of plasticiser from the surface. The lacquer of the invention is then applied on top of the dry, first-applied lacquer.

We have mentioned above a number of film-forming polymers which, having a limited compatibility with the various plasticisers used, can be used in the lacquer of the invention to prevent plasticiser migration. Such film-forming polymers can equally well be used to provide a plasticiser barrier-layer.

We provide therefore a two-coat lacquer system for applying on to the surface of a sheet, layer or moulded product made from a plasticised polymeric material, particularly plasticised polyvinyl chloride, the first lacquer, being applied on to the surface, serving to prevent migration of plasticiser from the surface and the second lacquer, being applied on top of the first lacquer, when dry, serving to render the lacquered surface suitable for painting with the usual commercially available paints.

We also provide a process for rendering the surface of a sheet, layer or moulded product made from a plasticised polymeric material, particularly plasticised polyvinyl chloride, suitable for painting with the usual commercially available paints, the process comprising applying on the surface a continuous coating of a dispersion of a film-forming polymer in a volatile liquid, heating the coating to cause evaporation of the liquid from the coating, applying on to the dry coating so formed a continuous coating of a dispersion of a film-forming polymer, in which is also dispersed from 90 to 480 parts by weight, per 100 parts by weight of the polymer, of a particulate inorganic material and heating this coating to cause evaporation of the liquid from the coating.

Whilst the above lacquer system is suitable for applying on to most products produced from plasticised polymeric materials, they are particularly suitable for applying on to the surface of a vinyl wallcovering such as a vinyl coated paper in order to allow it to be subsequently painted. Such embossed wallcoverings whilst offering technical advantages over conventional embossed wallpapers have the considerable disadvantage that they cannot be painted with, for example, emulsion paint. Apart from the vinyl wallcovering which we are currently selling under the Registered Trade Mark VYMURA, the lacquer system can also be used on other vinyl wallcoverings.

According to a further aspect of the invention, therefore, we provide a decorative wallcovering comprising a paper sheet having on one of its surfaces, its decorative surface, a coating of a plasticised vinyl polymer and, on the vinyl coating, two superimposed lacquer coatings, the first lacquer coating, being adjacent to the vinyl coating, serving to prevent plasticiser migration from the vinyl coating and the second lacquer coating serving to improve the adhesion of a decorative paint to the decorative surface of the wallcovering.

Such a wallcovering can be attached to a wall through the medium of a suitable, usually water based adhesive. On to the decorative, i.e., embossed surface of the wallcovering can then be applied, by brushing, any of the usual decorative paints including alkyd based paints, vinyl emulsion type paints, polyurethane type paints, urethane oil based coatings and distempers. After the applied paint has been allowed to dry, the painted wallcovering had the same properties as any other painted surface. In particular there was no suggestion of attack by plasticiser within the vinyl surface.

The invention is now illustrated by the following Examples in which all parts are by weight:-

EXAMPLE 1

A lacquer was prepared having the following composition:-

| Ingredient | Parts by Weight |
| --- | --- |
| Toluene | 66 |
| methyl ethyl ketone | 34 |
| polymethyl methacrylate (medium Molecular Weight) | 15 |
| polymethyl methacrylate (high M Wt) | 5 |

-Continued

| Ingredient | Parts by Weight |
| --- | --- |
| titanium dioxide (particle size 0.5 to 2.0 microns) | 36 |
| precipitated calcium carbonate (particle size 1.0 to 12.0 microns) | 32 |
| zinc naphthenate | 0.3 |

A thick (14 grams/square metre dry weight) layer of the above lacquer was formed as a continuous coating on the decorative, vinyl surface of a continuous sheet of a wallcovering sold by Imperial Chemical Industries under the Registered Trade More "Vymura." The vinyl coating on the wallcovering was heavily plasticised. The lacquer coating was heated to a temperature of 70°C to cause evaporation of the volatiles from the coating.

Samples of the coated sheet were subsequently attached to a wall through the medium of a suitable adhesive. On to the surface of the samples were applied by brushing a variety of decorative paints including alkyd based paints, vinyl acetate copolymer emulsion type paints, vinyl emulsion type paints, polyurethane type lacquers, urethane oil based coatings and distempers which were allowed to dry. These decorative paints adhered readily to the lacquered surface. Furthermore, there was no suggestion that plasticiser within the vinyl coating had migrated into the paint layer causing damage thereto.

EXAMPLE 2

A lacquer was prepared having the following composition:-

| Ingredient | Parts by weight |
| --- | --- |
| toluene | 66 |
| methyl ethyl ketone | 34 |
| polymethyl methacrylate (medium Molecular Weight) | 15 |
| polymethyl methacrylate (high M.Wt.) | 5 |

A layer of the lacquer was formed as a continuous coating on the decorative, vinyl surface of a continuous sheet of a vinyl wallcovering. The coating weight of wet lacquer was approx. 12 lbs/100 yards of sheet. The lacquer coating was heated to a temperature of approx. 70°C to cause evaporation of the solvent.

The layer of polymethyl methacrylate so formed served as a barrier against plasticiser migration from the vinyl coating on the wallcovering.

On top of the layer of polymethyl methacrylate was now applied, by means of a 55 screen trihelical roller, a second, pigmented, lacquer having the composition of the lacquer described in Example 1. The lacquer coating was heated to a temperature of 70°C to cause evaporation of the volatiles from the coating.

Samples of the coated sheet were subsequently attached to a wall through the medium of a suitable adhesive. On to the surface of the samples were applied, by brushing, a variety of decorative paints including alkyd based paints, vinyl acetate copolymer emulsion type paints, vinyl emulsion type paints, polyurethane type lacquers, urethane oil based coatings and distempers. These were allowed to dry. Each type of decorative paint adhered readily to the lacquered surface. Furthermore, there was no suggestion that plasticizer within the vinyl coating had migrated into the paint layer causing damage thereto.

EXAMPLE 3

Example 2 was repeated in entirety except that the two-coat lacquer system was applied on to the vinyl surface of a continuous sheet of a wallcovering sold by Imperial Chemical Industries Limited under the Registered Trade Mark "Vymura."

The lacquered surface could be satisfactorily painted with various decorative paints in the same way as in Example 2.

We claim:

1. A decorative wallcovering comprising a paper sheet having on one of its surfaces, its decorative surface, a coating of a plasticized vinyl polymer, and, on the vinyl coating, two superimposed dry lacquer coatings, the first lacquer coating, being free of plasticizer, serving to reduce plasticizer migration from the plasticized vinyl coating and comprising a film-forming polymeric material having a glass transition temperature greater than 70° and selected from the group consisting of polymers and copolymers of vinyl chloride, vinyl acetate, styrene, vinyl acetals, methyl methacrylate, acrylonitrile and polyvinyl alcohol, the second lacquer coating also being free of plasticizer and comprising a film-forming polymeric material selected from the said group and in the second lacquer coating being dispersed from 90 to 480 parts by weight, per 100 parts by weight of the polymeric material, of a particulate inorganic material having a particle size in the range 2.5 millimicrons to 40 microns, the second lacquer coating serving to render the coated surface of the wall covering suitable for painting with a decorative paint.

2. A decorative wallcovering as claimed in claim 1 in which the first lacquer coating is based on a film-forming polymeric material having a glass transition temperature greater than 95°C.

3. A decorative wallcovering as claimed in claim 1 in which in the second lacquer coating is dispersed from 90 to 390 parts by weight, per 100 parts by weight of the polymeric material, of a particulate inorganic material.

4. A decorative wallcovering as claimed in claim 1 in which, in the second lacquer coating, there is included from 0.05 to 5.0 parts by weight, based on 100 parts by weight of the film-forming material, of an additive which acts as a drier for those paints which are subsequently applied which harden by oxidation.

5. A decorative wallcovering as claimed in claim 4 in which the additive is a zinc soap.

6. A decorative wallcovering as claimed in claim 4 in which the additive is zinc naphthenate.

* * * * *